(12) United States Patent
Hellerman

(10) Patent No.: US 8,024,835 B2
(45) Date of Patent: Sep. 27, 2011

(54) TOOLS FOR TREATMENT OF A SUBSTANCE ON A SURFACE

(76) Inventor: Ayelet Hellerman, Tel-Aviv (IL)

( * ) Notice: Subject to any disclaimer, the term of this patent is extended or adjusted under 35 U.S.C. 154(b) by 1186 days.

(21) Appl. No.: 11/348,391

(22) Filed: Feb. 6, 2006

(65) Prior Publication Data
US 2006/0123579 A1 Jun. 15, 2006

Related U.S. Application Data

(63) Continuation of application No. PCT/IL2004/000750, filed on Aug. 16, 2004.

(30) Foreign Application Priority Data

Aug. 17, 2003 (IL) .......................................... 157435

(51) Int. Cl.
B05C 17/10 (2006.01)
(52) U.S. Cl. .................... 15/245.1; 15/236.01
(58) Field of Classification Search ............... 15/236.01, 15/236.07, 245, 245.1; D7/650
See application file for complete search history.

(56) References Cited

U.S. PATENT DOCUMENTS

| | | | | |
|---|---|---|---|---|
| 237,681 A * | 2/1881 | Fuller | | 15/121 |
| 1,156,209 A * | 10/1915 | Churchill | | 15/245.1 |
| 1,426,085 A * | 8/1922 | Kohn | | 30/124 |
| 1,658,884 A * | 2/1928 | Cusick | | 30/140 |
| 2,294,096 A * | 8/1942 | Rice | | 30/149 |
| 2,472,668 A * | 6/1949 | Lewandowski | | 30/169 |
| 2,566,112 A * | 8/1951 | Barnard | | 30/357 |
| 2,606,364 A * | 8/1952 | Gustafson | | 30/149 |
| 4,010,513 A * | 3/1977 | Sassi | | 15/245 |
| 4,777,692 A * | 10/1988 | Krzciok | | 15/236.07 |
| 5,042,512 A * | 8/1991 | Knight | | 132/212 |
| 5,074,027 A * | 12/1991 | Alviar et al. | | 29/525 |
| 5,437,074 A | 8/1995 | White et al. | | |
| 5,660,632 A * | 8/1997 | Volpe et al. | | 118/213 |
| D403,559 S * | 1/1999 | Terenzio | | D7/650 |
| 5,875,515 A * | 3/1999 | Dallas | | 15/236.05 |
| 5,956,799 A | 9/1999 | Cummings et al. | | |
| 2003/0200619 A1 | 10/2003 | Kelsey et al. | | |

* cited by examiner

Primary Examiner — Randall Chin
(74) Attorney, Agent, or Firm — Holtz, Holtz, Goodman & Chick, P.C.

(57) ABSTRACT

A method and tools operative for treatment of a substance in association with a surface of an object or body have a first treatment tool and a second backing tool. The treatment tool has a rigid retention portion and a treatment portion, and is manufactured as a single integrated tool. A backbone extends in cantilever out of the retention portion to support a resilient and flexible blade, retained at a twist angle relative to the handle. The blade is configured for controlled deflection about the backbone when vertical forces in excess of a predetermined force are met, to prevent damage to the surface or to the object. The retention portion and the treatment portion are disposed in mutual angular spatial relationship for ease of use of the tool. The backing tool supports the object during treatment.

18 Claims, 5 Drawing Sheets

TOOLS FOR TREATMENT OF A SUBSTANCE ON A SURFACE

This application is a Continuation of PCT/IL2004/000750 filed Aug. 16, 2004.

FIELD OF THE INVENTION

The present invention relates in general to the treatment of a substance disposed on a surface of an object or body, and in particular, to a method and to tools for treatment of a substance while preventing excessive forces, to avoid causing damage to the surface of and to the object or body.

BACKGROUND ART

Treatment of a substance is understood as the application and shaping or sculpturing of the substance on a surface, as opposed to scraping and removal of the substance from the surface. The surface pertains to an object or body, but reference to the surface of an object is also meant to be a reference to the surface of a body.

It is well known that very often, when a knife, even a butter knife, is used to spread butter on a cracker, or other brittle food, the cracker breaks before the butter is spread. The reason is that forces applied to the butter are also transferred from the knife, via the butter or directly, to the cracker. Likewise, when a spatula is used to dress a large open wound by application of a layer of unguent, the pressure exerted by the spatula is a problem since it not only spreads the ointment but also presses on the open wound, which is painful to the patient.

Therefore, it is desirable to use tools that allow the application of controlled force to a treated substance, and to the surface onto which the substance is treated, and prevent the transmission of excessive forces, to avoid causing damage to the surface of and to the object or body. Known putty knives and spatulas do not provide the desired solution.

Improvements to spatulas may deal with the human engineering aspects of the tool. In U.S. Pat. No. 5,956,799, Cummings et al. disclose improvements to make the handle ergonomically superior, comfortable for use, and convenient and easy to insert and retrieve from a pocket. The handle has an inner core and a softer overlay.

In US Patent No. US 2003/0200619, to Kelsey et al., reference is made to "a spatula for personal use" but the term spatula is not used in the conventional meaning since there is divulged a spatula "used in the manner of a scraper or a strigil". There is described a hand-tool for the removal of a preparation applied to the skin, with a material-removal blade made of an elastomeric material, at one or both ends of a handle.

DISCLOSURE OF THE INVENTION

A problem with conventional tools for treatment of a substance on a surface is that a tool often causes damage, or even breaks the surface, or the object, or body on which treatment takes place.

As a solution to the problem exposed above, there are provided a method and tools, such as a treatment tool, to be used alone, or in association with a backing tool.

The treatment tool has a rigid handle and a flexible, resilient, and soft blade, resembling a regular knife, but for a twist angle of the blade relative to the handle. In further contrast with a knife, a backbone extends out of the handle and supports the blade, which is configured to bend about the backbone in controlled deflection. The treatment tool thus has a blade that deflects by pivoting about the blade back.

When used for spreading a substance disposed on a surface, the treatment tool is held by the handle and translated in parallel to the surface, for the blade to spread the substance, just like spreading jam on a cracker. However, should a larger than permitted force be encountered, then the blade will deflect and prevent transmission of forces to the surface, to prevent the cracker from breaking. The blade is thus configured to deflect above a predetermined force, which is chosen to prevent transmission of excessive force that may damage the surface of and the object or body on which the substance is treated.

For a substance treated on the surface of a weak and brittle object, a backing tool is further provided to conform to the object, in support of the surface to be treated. Thereby, the object is fully supported to prevent bending moments caused by the treatment tool loading the object via the substance, and the development of stress and strain which might break the object.

A treatment tool made from polymeric materials, which is advantageous for the treatment of substances and is configured without sharp edges and corners, is also safe for use by children as a lightweight and practical utensil.

To remain cost-efficient, the treatment tool is fabricated as a one-piece implement, integrally made of two different materials in one single-step manufacturing process.

SUMMARY

It is an object of the present invention to provide a method for making tools operative for treatment of a substance (300) on a surface (401, 407) of an object or body (400), with a first tool, which is a treatment tool (100). The first tool has a retention portion (103) having a handle (107) with a handle length spanning from a handle root to a handle end, a handle height delimited by a handle back and a handle bottom, and a handle longitudinal axis which extends along the handle length, the handle being made from a rigid polymeric first material.

The first tool also has a treatment portion (105) having a blade (109) with a blade length spanning between a blade tip and a blade root, a blade width delimited by a blade back and a blade edge, and a blade longitudinal axis which extends along the blade length, the blade being resiliently flexible and made from a soft and bendable polymeric second material.

The first tool is characterized by the steps of providing a backbone (501) having a backbone length and a backbone longitudinal axis extending along the backbone length, the backbone extending outwardly away from the handle root and being made from the first material, of supporting the blade length in fixed connection to and along the backbone length, and of configuring the blade for controlled deflection about the backbone. Thereby, when operated to treat a substance, the controlled deflection of the blade limits the forces transmitted from the first tool to the surface of and to the object or body.

It is another object of the present invention to provide a first tool where the handle back and the handle bottom define a first plane, the blade back and the blade edge define a second plane, and the second plane is disposed to form a selected first angle relative to the first plane, where the first angle is a twist angle selected to suit treatment needs. The twist angle is less than 45°, or is less than 15.

It is yet another object of the present invention to provide a first tool operated in association with a second tool, which is a backing tool (200) that is characterized by providing a backing bottom (203) for rigid support of the object, and by configuring the backing tool to conform in load supporting association with the object, whereby configured load support prevents damage to the object when the treated object is either one of both and both brittle and frangible. The backing tool is preferably configured to facilitate introduction therein and removal thereout of the object, respectively, before and after treatment, and for the secure restraint of the object during treatment.

It is still another object of the present invention to provide a first tool with a handle longitudinal axis disposed to form a selected second angle relative to the backbone longitudinal axis, and the second angle is a bend angle selected to suit treatment needs.

It is a further object of the present invention to provide a first tool wherein the backbone extends as a cantilever beam having a beam cross-section that may vary along at least a portion of the backbone length, and the backbone is attached to the handle root by a larger beam cross-section to terminate in a backbone free end having a smaller beam cross section, and the blade has a blade root connected to the handle root, and a blade width that may vary along at least a portion of the blade length in compound curved shape configured to match smooth continuous transition with the backbone and with the handle, whereby the treatment portion and the retention portion smoothly blend in continuous transition.

It is a yet a further object of the present invention to provide a first tool wherein the blade is configured to bend in controlled deflection according to parameters selected alone or in combination from the group of parameters consisting of geometry of the blade, properties of the second material, attachment of the blade back to the backbone, and attachment of the blade root to the handle root.

It is still a further object of the present invention to provide a first tool wherein an intermediate portion (601) having a neck (603) with a neck length spanning from a neck front to a neck back, and a neck longitudinal axis which extends along the neck length, with the neck being connected by the neck front to the blade root, and by the neck back to the handle root; a selected first neck angle disposed between the handle longitudinal axis and the neck longitudinal axis; and a selected second neck angle disposed between the backbone longitudinal axis and the neck longitudinal axis, whereby the first neck angle and the second neck angle are selected to suit treatment needs.

Furthermore, the blade may have both a geometry and a supported attachment selected to meet deflection parameters, and the geometrical configuration of the treatment tool is selected to suit user and treatment needs.

Moreover, a cutout (153) may separate the blade root from the handle root.

In addition, the treatment tool may be manufactured with controlled blade deflection properties in one single-step operation by one production process as a single unitary tool.

It is furthermore an object of the present invention to provide a first tool wherein a first tool operative as a treatment tool (100) for treatment of a substance (300) on a surface (401, 407) of an object or body (400), comprising:

a retention portion (103) having a handle (107) with a handle length spanning from a handle root to a handle end, a handle height delimited by a handle back and a handle bottom, and a handle longitudinal axis which extends along the handle length, the handle being made from a rigid polymeric first material, and a treatment portion (105) having a blade (109) with a blade length spanning between a blade tip and a blade root, a blade width delimited by a blade back and a blade edge, and a blade longitudinal axis which extends along the blade length, the blade being resiliently flexible and made from a soft and bendable polymeric second material, characterized by:

a backbone (501) having a backbone length and a backbone longitudinal axis extending along the backbone length, the backbone extending outwardly away from the handle root and being made from the first material, a first plane defined by the handle back and the handle bottom being disposed to form a selected first angle relative to a second plane defined by the blade back and the blade edge, where the first angle is a twist angle selected to suit treatment needs.

It is moreover an object of the present invention to provide a first tool wherein the backbone supports the blade length in fixed connection to and along the backbone length, and the blade is configured for controlled deflection about the backbone, whereby when operated to treat a substance, controlled deflection of the blade limits the forces transmitted from the first tool to the surface.

BRIEF DESCRIPTION OF THE DRAWINGS

To understand the invention and to see how it may be carried out in practice, preferred embodiments will now be described, by way of non-limiting example only, with reference to the accompanying drawings, in which similar reference characters denote similar elements throughout the several views.

BEST MODES FOR CARRYING OUT THE INVENTION

Figure 1:
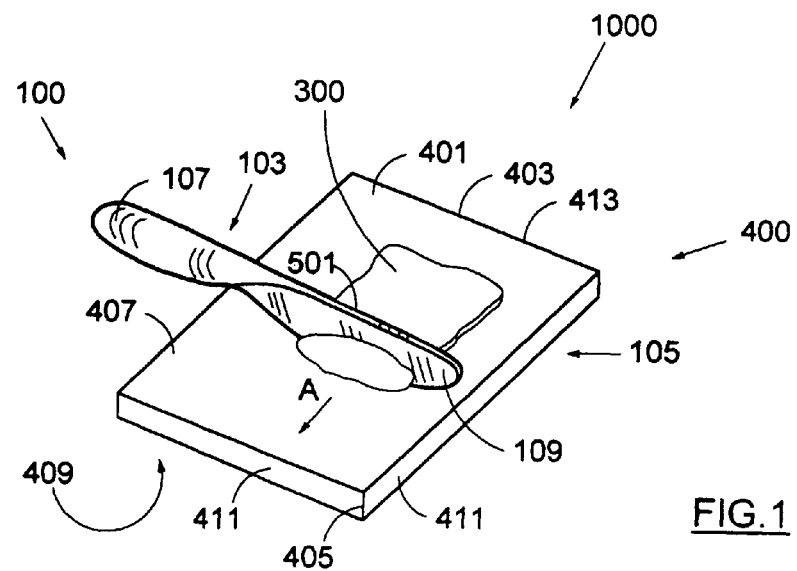
FIG. 1 is a first embodiment of the treatment tool.
Figure 2:
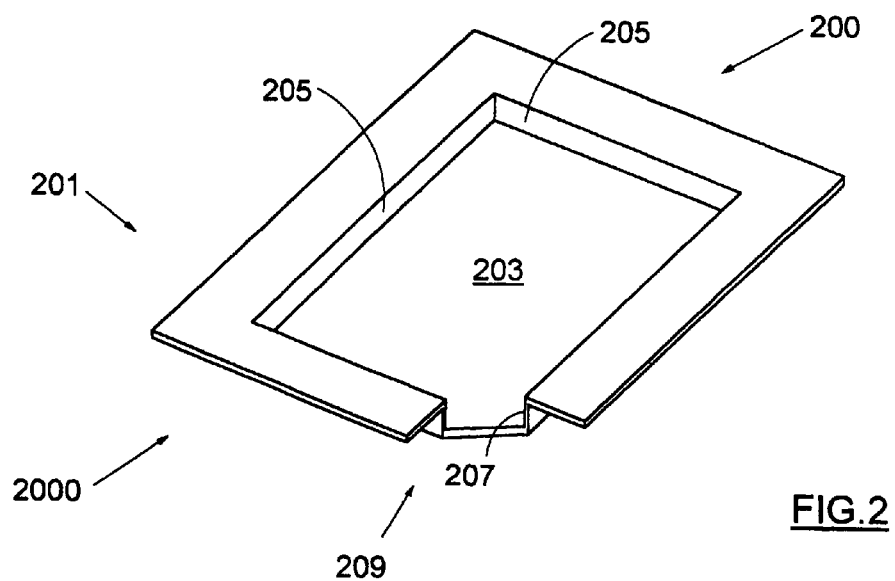
FIG. 2 is a first embodiment of the backing tool.

FIG. 1 illustrates a first embodiment 1000 of a first tool, which is a treatment tool 100, and FIG. 2 depicts a first embodiment 2000 of a second tool, which is a backing tool 200, or backing 200.

In FIG. 1 the treatment tool 100 is operated for treatment of a substance 300 disposed on an object or a body 400, on a surface 401 facing upward. For example, a user, not shown in the Figs., may grip the treatment tool 100, to spread the substance 300 on the surface 401.

The treatment tool 100 of embodiment 1000 has a retention portion 103 and a treatment portion 105. The treatment tool 100 is made of at least two different synthetic materials, such as polymeric plastic materials, and is fabricated in one single manufacturing process. For example, a twin material injection or molding process, such as double injection molding, is suitable. The treatment tool 100 is thus of one-piece integral construction, manufactured in a single-step operation by one production process, as a unitary implement. To obtain a hollow retention portion 103, the double injection molding process is combined with a gas or blow molding process.

The retention portion 103 is configured as a solid or as a hollow portion selected to suit treatment needs, with dimensions set to fit either an actuator held by a machine, not shown in the Figs., or to match the hand(s) of a user for ease of handling. When configured as a manually operated utensil, then the retention portion 103 is implemented as a handle 107.

The treatment portion 105, which is substantially planar, is disposed at an angle α with respect to the retention portion 103, to facilitate use and suit needs of operation of the treatment tool 100. When using a blade for spreading a substance, it is known to be advantageous to hold the blade at an acute angle with the surface, in the direction of the spreading motion, like when spreading jam on a slice of bread. When doing so with a conventional knife, where the blade is coplanar with the height of the handle, then the wrist must be twisted. Therefore, to prevent uncomfortable wrist twisting, the treatment portion 105 is twisted relative to the retention portion 103, to form a twist angle α selected for example, as 45° or less. Thereby, when spreading, the retention portion 103 is held in perpendicular to the surface 401, when translated in parallel to, and in the direction of treatment indicated by the arrow A in FIG. 1, with the treatment portion 105 making an acute angle α with the surface, for comfort, and to ease and suit treatment needs.

In the embodiment 1000, the treatment portion 105 has a blade 109. The blade 109 is supported by a backbone 501 extending out of the retention portion 103. The backbone 501 and retention portion 103 are made of a rigid polymeric first material. The blade 109 is made out of a second material, such as a synthetic polymeric material, deformable and resiliently flexible, for example, an elastomer.

Figure 3:
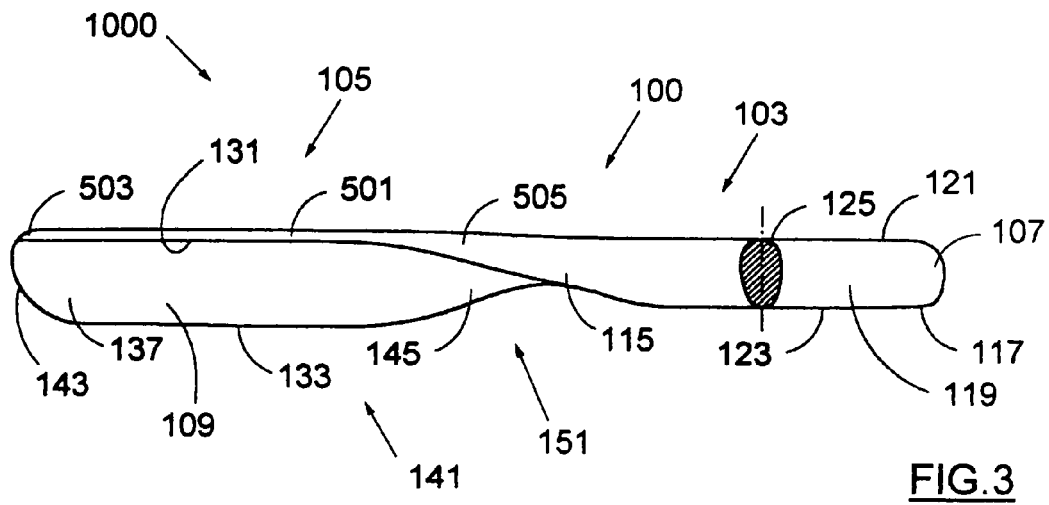
FIGS. 3 to 5 are, respectively, a side elevation, a front elevation, and a top elevation of the treatment tool shown in FIG. 1, FIGS. 6 to 8 present respectively, a side elevation, a front elevation, and a top elevation of a second embodiment of the treatment tool shown in FIG. 1, and FIGS. 9 to 13 are further embodiments of the treatment tool depicted in FIG. 1.
Figure 4:
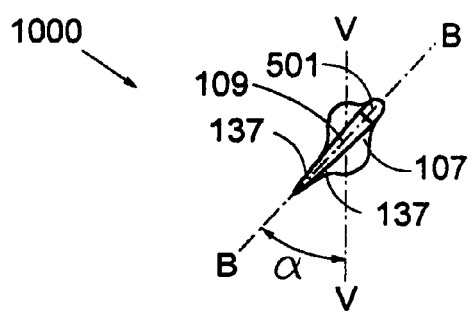
Figure 5:
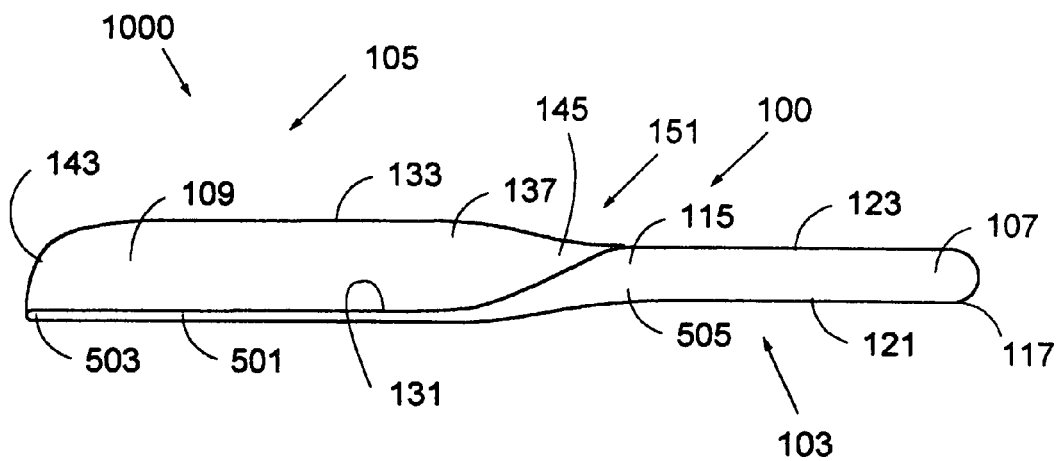

In FIGS. 3, 4, and 5, the treatment tool 100 is described in more details. The retention portion 103 is shown as a rigid handle 107, with a handle length spanning from a handle root 115 to a handle end 117 at an end portion 119, a handle height delimited by a handle back 121 and a handle bottom 123, and a handle longitudinal axis which extends along the handle length, and a handle cross-section 125. The handle is dimensioned for comfort and to suit retention and treatment needs. In FIG. 4 the height of the handle 107 is disposed vertically and is aligned with a handle height axis V-V.

The backbone 501 has a backbone length spanning between a backbone free end 503 and a backbone root 505, and a backbone longitudinal axis extending along the backbone length, and is made of the rigid polymeric first material. In the embodiment 1000, the backbone 501 extends outwardly away from the handle root 115, as a rigid cantilever beam disposed in aligned coextensive longitudinal attachment to and in support of the length of the blade back.

The blade 109, which is coupled to the handle 107, is configured generally as a lamina, thin, flexible, soft, and resilient relative to the retention portion 103. In use, treatment application forces are transmitted from the blade 109 to the substance 300 and to the surface 401. Such application forces from the blade 109 are decomposed into force components perpendicular and parallel to the surface 401. The blade 109 is designed to deflect about the backbone 501 and thereby prevent the transmission of perpendicular force components to the surface 401. Deflection parameters are for example the geometry of the blade 109, such as length, width, thickness, length of retention and attachment to the backbone 501 and to the handle 107. Further parameters are geometry of the backbone 501 and properties of the first and second material. The required deflection of the blade 109 differs according to the nature of the substance 300, to the strength and properties of the object 400 and of the surface 401, and to the required treatment.

The blade 109 has a blade length spanning between a blade tip 143, which is a free end of the blade, and a blade root 145, which is adjacent to the handle root 115, a blade width delimited by a blade back 131 and a blade edge 133, and a blade longitudinal axis which extends along the blade length, the blade being resiliently flexible and made from a soft and bendable polymeric second material. Two opposite blade faces 137 define a blade thickness. The blade edge 133 may have a smooth curvilinear shape 141 that spans from the blade tip 143 to the blade root 145 to blend with the handle root 115.

In FIG. 4 the blade 109, shown aligned with a blade thickness axis B-B, is twisted at a twist angle α with respect to the handle height axis V-V, such as for example, an angle of 45° or less. Generally, the twist angle is acute with the surface 401 in the direction of treatment of the substance 300, and is selected to suit the user, the substance 300, the surface 401 of the object or body 400, and treatment needs. For left-hand users, operating treatment in a direction opposite to that of right-hand users, the twist angle α keeps the same absolute value but with a negative sign, thus mirrored respectively to the handle height axis V-V.

With reference to FIGS. 3 and 5 it is noted that a transition interface 151 couples between the retention portion 103 and the treatment portion 105. The blade root 145, the handle root 115, and the backbone 501 may blend, if desired, along a compound curved line configuration, selected in accordance with the desired deflection pattern of the blade 109, although the transition interface 151 is possibly a straight line crossing the blade width, and may even be perpendicular thereto.

The blade 109 is fixedly attached to the backbone 501 along the length of the blade back 131, and is configured for resilient deflection relative to and about the backbone 501, which is rigid.

The flexibility of the blade 109 is selected to suit the specific needs of a user. Such uses are for example, spreading a glazing on a soft cake, butter on a toast, an ointment on the skin, or a soft chemical on a delicate substrate in an industrial process. However, the deflection properties of the blade are selectable and are adjusted to specific needs, with amongst them, the desire to prevent the application of vertical forces exceeding a predetermined limit on the surface 401. For example, when held by the handle 107, the blade 109 will flex and bend about the backbone 501, to prevent the transfer of large forces from the hand of the user to the treatment tool 100, and from there to the surface 401. It is noted that a short retention handle diminishes treatment application forces. For manual use, the dimensions of the treatment tool are adapted to the hands of the user, adolescent or child, and to suit the treatment needs. Suiting the treatment needs refers to the requirements of the treatment itself, the needs of the user or of a machine, of the substance 300, of the surface 401 and of the object or body 400.

The use of the treatment tool 100 on an object or body 400 extends to inert objects as well as to human, animal, and vegetal bodies.

The embodiment 1000 show in FIG. 1 is a simplified example of an object 400, which is depicted as a relatively thin object 403, substantially rectangular, and of uniform object thickness 405, with an upward facing surface 407, opposite and parallel to a downward facing surface 409. A peripheral sidewall 411 couples between the upward facing surface 407 and the downward facing surface 409, and delimits the thickness 405 and an object perimeter 413.

In contrast with the simplified example, the object 400 may have any regular or irregular geometric shape. Generally, when the object thickness 405 is thin relative to the planar dimensions, and when the object 400 is brittle or frangible, therefore fragile and easily broken, then it is difficult to treat a substance 300 on the surface 401 with conventional tools, without causing damage or harm to the object. To prevent damage, it is thus desired to avoid the application of forces that are transmitted from a conventional treatment tool to the object whereon a substance is treated. However, in addition to local forces applied to the object 400, bending moments and their resulting forces, pertaining to the support given to the treated object 400, must also be considered.

To better distribute forces applied by the blade 109 via the substance 300 onto the surface 401, and prevent breakage of the latter under bending moments creating stresses and shear forces emanating from the treatment tool 100, the body 400 is supported, preferably on the totality of its downward facing surface 409, by a conformal rigid backing 200.

Returning to FIG. 2, there is depicted an embodiment 2000 of a rigid backing 201 for receiving the body 400, which is not shown in FIG. 2, in the form of a concave planar dish, or deep-drawn dish, for retention therein of the object 400. The rigid backing 201, for support of the object 400, prevents movement of the object during treatment, and enables easy retrieval after the treatment. The rigid backing 201 preferably has a backing bottom 203 and retaining walls 205 conforming to the object perimeter 413. The one or more retaining walls 205 have a wall height 207 sufficient to retain at least one peripheral sidewall 411 of the object or body 400, and if desired, low enough to permit easy treatment of the substance 300 on the surface 401. Thus, the rigid backing 201 is generally dish-like, with a backing bottom 203 on which the downward facing surface 409 of the body 400 is received, and from which at least one retaining wall 205 rises, such as for example, at least one circular retaining wall 205 for a circular body 400, or four retaining wall 205 for a quadrilateral body shape. If desired, a backing opening 209 is provided to ease retrieval of the object 400 from the backing 200. Although the backing opening 209 is shown as a cutout, any other one or more opening fitting the purpose is acceptable, such as a retrieval bore opened in the backing bottom 203.

For treatment of the substance 300 on the object 400, the object is first received in the rigid backing 201, with the backing bottom 203 next to and in support of the downward facing surface 409, wherein it is constrained by the retaining wall 205, with the upward facing surface 407 up. Once the body 400 is in place in the backing 200 and the substance 300 is deposited on the upward facing surface 407, the blade 109 is used to treat the substance, for example, by translation in parallel to the surface 407. After treatment, the body 400 is retrieved out of the rigid backing 201, with or without help of backing opening(s) 209.

In another embodiment, not shown in the Figs., the rigid backing 201 is hollowed out of a block of material wherein the body is deposited as described above, ready for treatment of the substance 300. Access to the object 400 for retrieval is provided by a backing opening 209, or hollow-out. In the same manner, any rigid backing 201 matching and conforming the object 400 may be used as support. Obviously, the backing 201 may receive various shapes, and each shape may possibly serve more than one object 400. Furthermore, the rigid backing opening 209 is optional, when it is easy to retrieve the object 400, or for example, by overturning the rigid backing.

Figure 6:
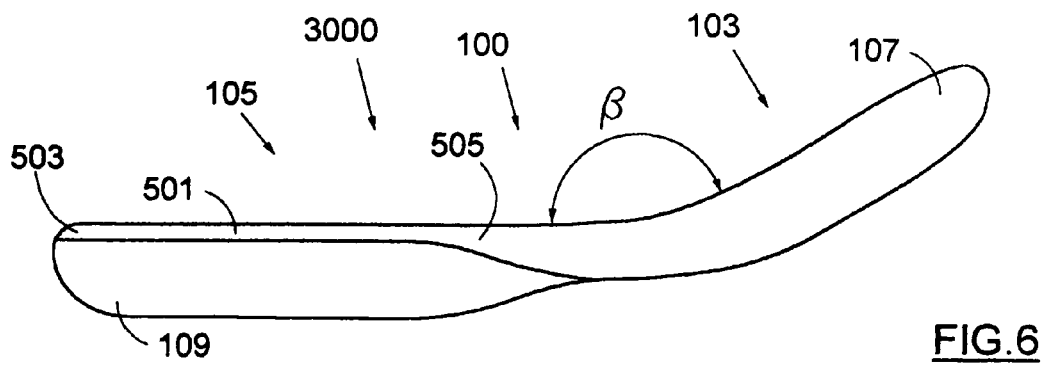
Figure 7:
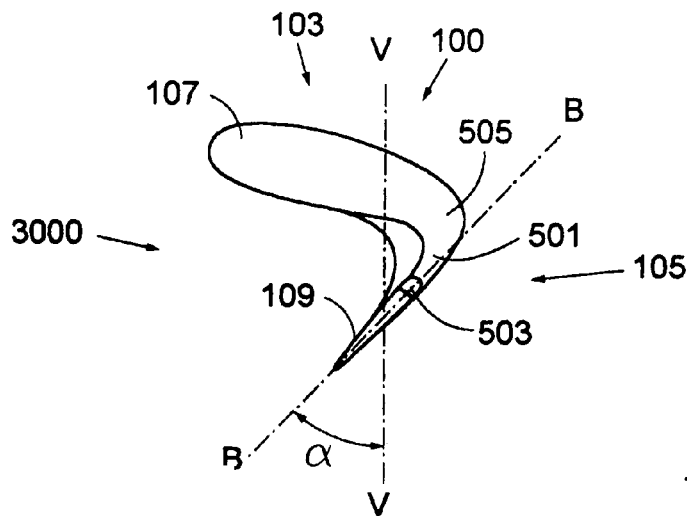
Figure 8:
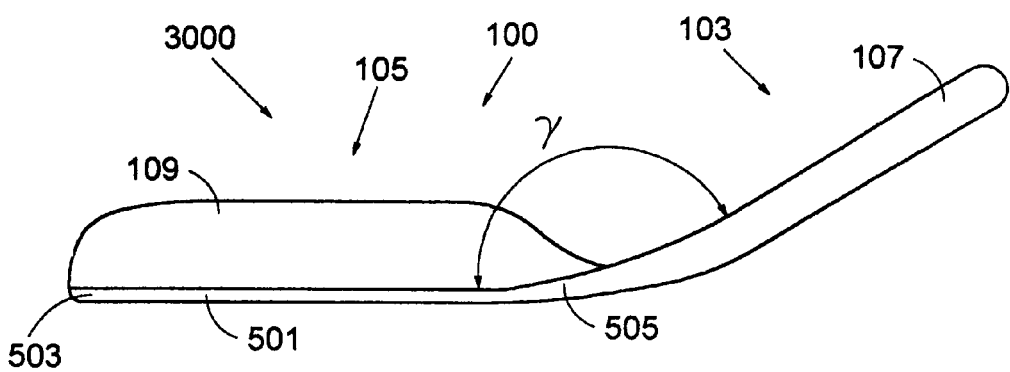

With reference to FIGS. 6 to 8, there is shown a second embodiment 3000 of the treatment tool 100. In FIG. 7, the blade thickness axis B-B of the blade 109 is shown twisted to an acute twist angle $\alpha$ relative to vertical V-V, which twist angle is selected as desired, to either side of the vertical V-V, and may also be zero.

To facilitate treatment of the substance 300 on the surface 401, the handle length of the retention portion 103 is inclined at a selected obtuse bend angle $\beta$, shown in FIG. 6, with respect to the blade backbone 501. The bend angle $\beta$ is not restricted to be disposed solely in the plane of the paper of the side elevation of FIG. 6, and may become a spatial angle, as necessary to fit treatment requirements.

To further facilitate treatment of the substance 300 on the surface 401, the handle length of the retention portion 103 may be disposed to make a selected skew angle $\gamma$, shown in FIG. 8, with respect to the backbone 501. Again the skew angle $\gamma$ is not restricted to be disposed solely in the plane of the paper of the top elevation of FIG. 8, and may become a spatial angle, as required to fit treatment requirements.

It is thus understood that the retention portion 103 and the treatment portion 105 of the treatment tool 100 may be disposed at mutual spatial angles defining a configuration of spatial angular combinations of twist, bend, and skew angles, respectively angles $\alpha$, $\beta$, and $\gamma$, appropriately selected to best suit treatment convenience, needs, and requirements.

As a practical example there is considered the manual spreading of a substance 300, such as soft butter, on the upward facing surface 407 of a brittle object 400, shown in FIG. 2. A thin matzo is selected as the object 400, sometimes also referred to as "matza", which is a Hebrew word for unleavened bread eaten at Passover. Preferably, the matzo is entered before treatment into the backing 200, supported and constrained, respectively, by the rigid backing 203 and by the retaining walls 205. With a certain amount of butter on the upward facing surface 407 of the matzo, the butter is spread by translation of the treatment tool 100 in parallel to the upward facing surface 407. When done, the matzo is retrieved from the backing 200, taking advantage, or not, of the backing opening 209.

By experience, it is practically almost impossible not to break a matzo, when spreading butter thereon by help of a conventional knife, especially when the matzo is rested on an even slightly concave plate. However, the treatment tool 100 achieves the task without difficulty.

The treatment tool 100 is not limited to the spreading of edibles, but is of use with cosmetics, medications, animals, industrial processes, and other substance treatment related activities.

Further embodiments of the treatment tool 100 are illustrated in FIGS. 9 to 13.

Figure 9:
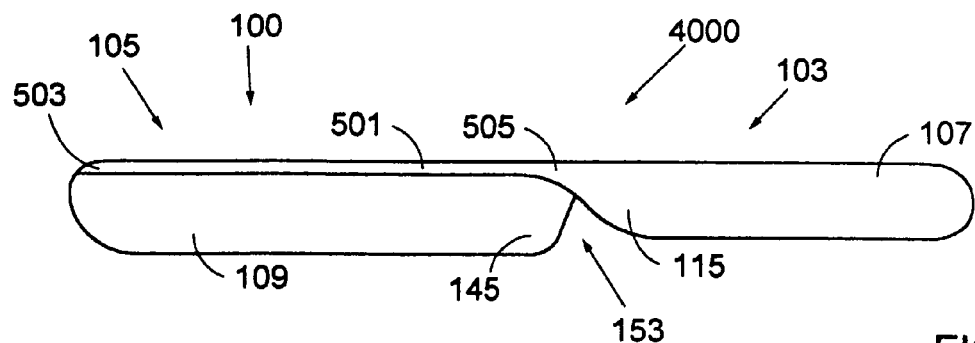

In FIG. 9 an embodiment 4000 has a blade 109 retained only to the backbone 501, as the blade is separated from the handle 107 by a cutout 153. The cutout 153 separates between the blade root 145 and the handle root 115, leaving the blade 109 free to bend about the backbone 501, without interference from the now inexistent transition interface 151 of embodiment 1000. The deflection pattern of the blade 109 relative to the backbone 501 is now governed solely by the geometry and the attachment of the blade 109, and by the second material from which the blade is implemented.

The parameters influencing the deflection of the blade 109 relative to the backbone 501 are thus seen to be dependent on the length of attachment of the blade to and along the backbone 501, to the configuration of the transition interface 151, or cutout 153, to the geometry of the blade 109, and to the second material from which the blade is made. Careful parameter selection therefore permits to impart controlled deflection patterns to the blade 109, as desired.

Figure 10:
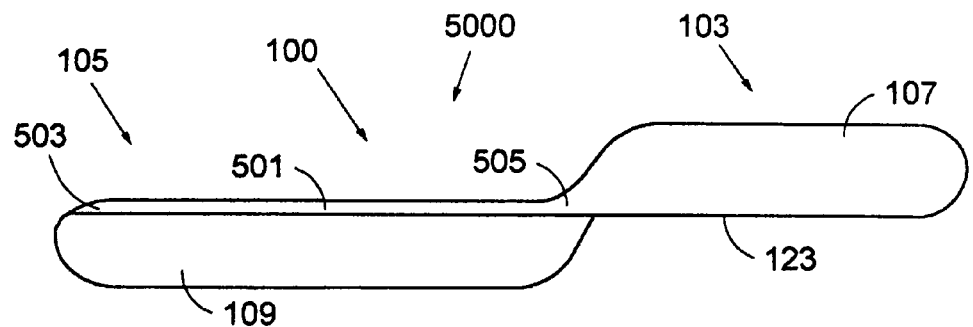

A further embodiment 5000 is depicted in FIG. 10. The backbone 501 is coextensive with the handle bottom 123, but the blade 109 remains attached below, thus to the opposite side of the backbone. The backbone 501 is thus disposed in the middle, with the handle 107 thereover, and the blade 109 thereunder. Keeping the handle 107 elevated above the upward facing surface 407 of the object or body 400, shown in FIG. 2, very often eases on the treatment operation. The embodiment 5000 may be configured to incorporate the various spatial angles, namely twist, bend, and skew angles, respectively angles α, β, and γ, but there is no attachment between the blade 109 and the handle 107.

Figure 11:
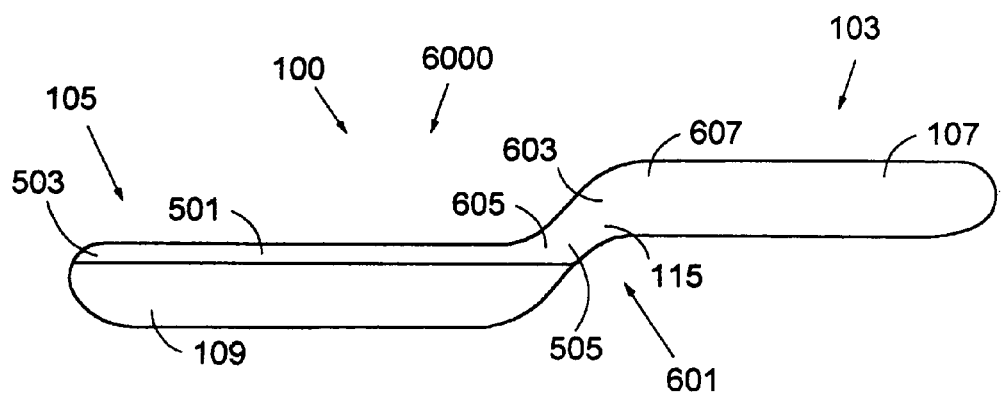

A next embodiment 6000 is illustrated in FIG. 11, with an intermediate portion 601 forming a neck 603 disposed intermediate the retention portion 103 and the treatment portion 105. The neck has a neck length spanning from a neck front 605 to a neck back 607, and a neck longitudinal axis which extends along the neck length. The neck front 605 is attached to the backbone root 505 and the neck back 607 is connected to the handle root 115. The handle 107 is thus disposed above and to the opposite side of the backbone 501 to which blade 109 it is attached.

Both the neck front 605 and the neck back 607 may be disposed in any of the various spatial angles, namely bend, and skew angles, respectively angles β, and γ, relative to the backbone 501 and to the handle 107, with the blade 109 at an angle α.

Figure 12:
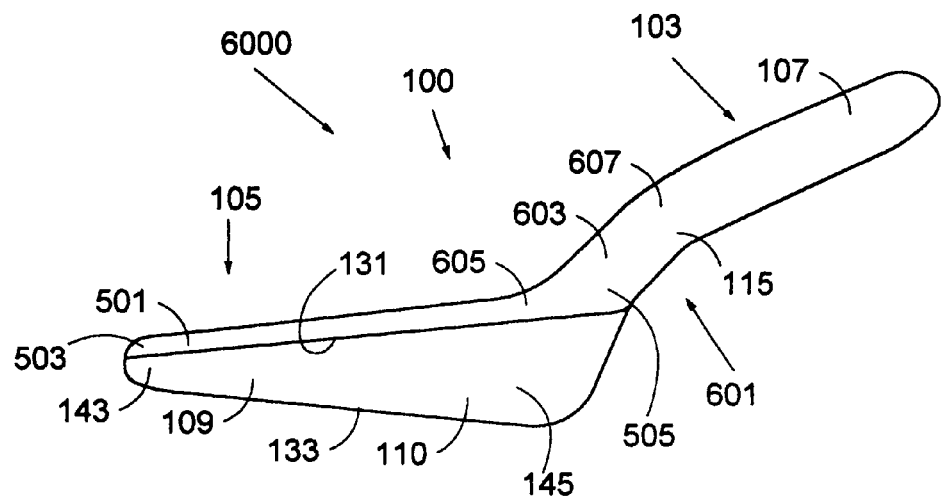

A simple example of the embodiment 6000 with the neck 603 at an angle with the backbone 501 and with the handle 107 is provided in FIG. 12. In addition, the blade 109 has a blade width different at the blade tip 143 and at the blade root 145. The shape of the blade 109 is not necessarily generally rectangular but the blade edge 133 may be slanted relative to the blade back 131 and to the backbone 501. For example, a trapezoidal blade 110 is often practical. Such a configuration is advantageous not only for improving the ease of use but is also beneficial for the control of the desired blade deflection properties.

Figure 13:
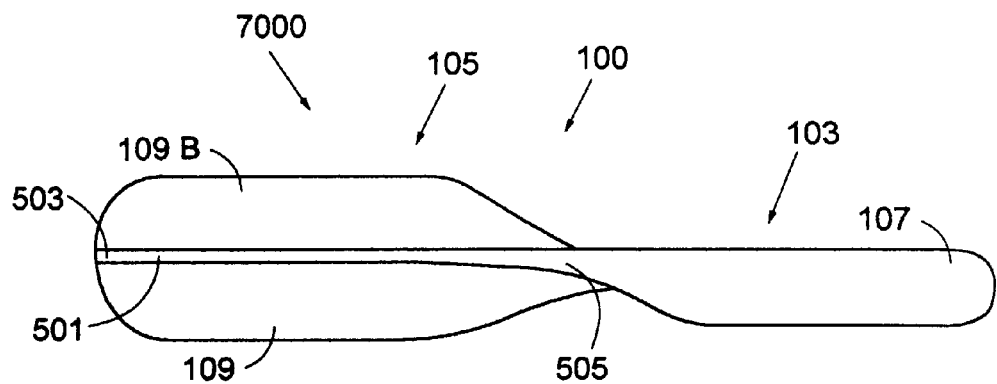

A last embodiment 7000 is shown in FIG. 13, with one blade 109 on one side of the backbone 501, and a second blade 109B on another side of the backbone. If desired, both blades 109 and 109B are made of the second material, which is soft and flexible. Else, the blade 109 is made from the second material and the second blade is made from the same first rigid material from which the backbone 501 is made, or vice versa. The size of the blades 109 and 109B are independent of each other, and their disposition, whether planar or not, is selected to suit needs. The same combination of twist, bend, and skew angles, respectively α, β, and γ as described above, are also applicable in embodiment 7000.

In the same manner as the treatment portion 105 is made of both the first and the second material, so is the retention portion 103 which may have a handle made of the second rigid material and padding to the handle 107, not shown in the Figs., made of the soft first material.

As another feature in any of the embodiments 1000 and 3000 to 7000, the backbone 501 may have a varying beam cross-section along the backbone length, with a larger beam cross-section at the backbone root 505, and a smaller beam cross section at the backbone free end 503. Likewise, the handle 107 may have a varying handle cross-section 125 along the handle length, with a larger handle cross-section at the handle root 115, and a smaller handle cross section at the handle end 117. Moreover, the blade 109 may have a blade thickness that is not uniformly variable over the width of the blade.

It is noted that the many embodiments 1000, and 3000 to 7000 described above may be combined to form more embodiments. For example, as in FIG. 9, the distinguishing neck 603 of embodiment 6000 may be combined with any of the other embodiments, to feature a handle 107 slanted in spatial angular relationship to the blade 109. Furthermore, a handle 107, with a spatial angle relative to the blade 109 and to the backbone 501, as well as trapezoidal blade 110 of the embodiment 6000, may all be combined, together or in part, for the configuration of additional embodiments. It is thus noted that the many features of the various embodiments 1000 and 3000 to 7000 may be used alone and in combination, even though not all the possible versions have been described.

The treatment tool 100 described above was referred to as a tool for use with brittle substrates, in industry, medicine, cosmetics, at domicile, and the like. However, as a twin-material unitary instrument made of plastic material in a single process operation, thus at low cost, the treatment tool 100, featuring a soft, pliable, and deflecting blade 109, has many other uses as well.

For example, it becomes an ideal tool for children since it is safe to handle, in contrast with a knife, but nevertheless allows for easy use. The treatment tool 100 works well for spreading toppings on cakes having soft, semi-rigid, and even rigid consistency, for applying ice cream, for spreading butter, jam and the like on slices of bread, for making sandwiches, as well as for many other cooking and baking uses. However, in cosmetic treatments, the treatment tool 100 is advantageous for applying and for removing creams, respectively, directly to and from the skin of the body, thanks to its soft elastomeric blade 109. The same holds for industrial and other processes where substances 300 are deposited for treatment on surfaces, or removed therefrom.

When the handle 107 is hollow it may become a receptacle closed by a plug, not shown in the Figs., or else, the hollow handle is closed permanently. When left open, the hollow of the handle is configured to receive an elongation member, to lengthen the retention portion 103, thus to permit to distance the treatment tool 100 outwardly away from the machine or from the user.

It will be appreciated by persons skilled in the art, that the present invention is not limited to what has been particularly shown and described hereinabove. Rather, the scope of the present invention is defined by the appended claims and includes both combinations and subcombinations of the various features described hereinabove as well as variations and modifications thereof which would occur to persons skilled in the art upon reading the foregoing description. For example, the blade 109 is not necessarily a single unit but may be composed of a plurality of blades attached to the backbone 501, with or without open intervals therebetween.

The invention claimed is:

1. A method for making a unitary one-piece treatment tool operative for spreading of a substance on a surface of an object which is selected from a group including objects that are brittle, fragile, frangible, and easily broken, the method comprising:

providing a retention portion having a handle with a handle length spanning from a handle root to a handle end, a handle height delimited by a handle back and a handle bottom, and a handle longitudinal axis which extends along the handle length, the handle being made from a rigid polymeric first material;

providing a treatment portion having a blade with a blade length spanning between a blade tip and a blade root, a blade width delimited by a blade back and a blade edge, and a blade longitudinal axis which extends along the blade length, the blade being made from a soft and bendable polymeric second material and being resiliently flexible;

providing a backbone having a backbone length and a backbone longitudinal axis extending along the backbone length, the backbone extending outwardly away from the handle root and being made from said rigid polymeric first material;

supporting the blade length with the blade back in fixed connection to and along the backbone length; and configuring the blade for controlled deflection about the backbone by selecting blade deflection parameters such that when a force is applied to the treatment tool in the direction of the object to treat and spread the substance on the surface of the object, the blade is controllably deflected to limit forces transmitted from the treatment tool to the surface of the object that exceed a predetermined limit;

wherein:

the handle and the blade of the treatment tool are fabricated in a one-piece integral construction which is manufactured in a single-step operation by one production process;

the handle back and the handle bottom of said treatment tool define a first plane;

the blade back and the blade edge of said treatment tool define a second plane; and the second plane is disposed to form a selected first angle relative to the first plane, where the first angle is a twist angle selected to suit treatment needs.

2. The method according to claim 1, wherein:
the twist angle is less than 45°.

3. The method according to claim 1, wherein:
the twist angle is less than 15°.

4. The method according to claim 1, wherein said treatment tool is operated in association with a second tool, which is a backing tool, the method further comprising:

providing a backing bottom for rigid support of the object, and configuring the backing tool to conform in load supporting association with the object to prevent damage to the object.

5. The method according to claim 4, wherein:
the backing tool is configured to facilitate introduction therein and removal thereout of the object, respectively, before and after treatment, and for secure restraint of the object during treatment.

6. The method according to claim 1, wherein:
the handle longitudinal axis is disposed to form a selected second angle relative to the backbone longitudinal axis, and the second angle is a twist angle selected for spreading a substance to suit treatment needs of the object.

7. The method according to claim 6, wherein:
the backbone extends as a cantilever beam having a beam cross-section that varies along at least a portion of the backbone length, and the backbone is attached to the handle root by a larger beam cross-section to terminate in a backbone free end having a smaller beam cross section relative to the larger beam cross-section, the blade root is connected to the handle root, and the blade width varies along at least a portion of the blade length in a compound curved shape configured to match smooth continuous transition with the backbone and with the handle, whereby the treatment portion and the retention portion smoothly blend in continuous transition, and the treatment tool operative for spreading the substance on the surface of the object is configured for preventing transmission of excessive forces, to avoid causing damage to the object.

8. The method according to claim 6, wherein:
the twist angle is selected as a spatial angle.

9. The method according to claim 8, wherein:
the backbone extends as a cantilever beam having a beam cross-section that varies along at least a portion of the backbone length, and the backbone is attached to the handle root by a larger beam cross-section to terminate in a backbone free end having a smaller beam cross section relative to the larger beam cross-section, and the blade root is connected to the handle root, and the blade width varies along at least a portion of the blade length in a compound curved shape configured to match smooth continuous transition with the backbone and with the handle, whereby the treatment portion and the retention portion smoothly blend in continuous transition.

10. The method according to claim 8, wherein:
an intermediate portion is provided, the intermediate portion having a neck with a neck length spanning from a neck front to a neck back, and a neck longitudinal axis which extends along the neck length, with the neck being connected by the neck front to the blade root, and by the neck back to the handle root, a selected first neck angle is disposed between the handle longitudinal axis and the neck longitudinal axis, a selected second neck angle is disposed between the backbone longitudinal axis and the neck longitudinal axis, and the first neck angle and the second neck angle are selected to suit treatment needs.

11. The method according to claim 8, wherein:
a cutout separates the blade root from the handle root.

12. The method according to claim 8, wherein:
the treatment tool is manufactured with the blade deflection parameters in said one single-step operation by said one production process.

13. The method according to claim 1, wherein:
the backbone extends as a cantilever beam having a beam cross-section that varies along at least a portion of the backbone length, and the backbone is attached to the handle root by a larger beam cross-section to terminate in a backbone free end having a smaller beam cross section relative to the larger beam cross-section, the blade root is connected to the handle root, and the blade width varies along at least a portion of the blade length in a compound curved shape configured to match smooth continuous transition with the backbone and with the handle, whereby the treatment portion and the retention portion smoothly blend in continuous transition, and the treatment tool operative for spreading the substance on the surface of the object is configured for preventing transmission of excessive forces, to avoid causing damage to the object.

14. The method according to claim 1, wherein:
the blade deflection parameters include at least one of a geometry of the blade, properties of the second material, an attachment of the blade back to the backbone, and an attachment of the blade root to the handle root, the second material is deformable and resiliently flexible for spreading of the substance on the surface of the fragile object, and the treatment tool is fabricated in said one production process by twin material injection.

15. The method according to claim 1, wherein:
an intermediate portion is provided, the intermediate portion having a neck with a neck length spanning from a neck front to a neck back, and a neck longitudinal axis which extends along the neck length, with the neck being connected by the neck front to the blade root, and by the neck back to the handle root, a selected first neck angle is disposed between the handle longitudinal axis and the neck longitudinal axis, and a selected second neck angle is disposed between the backbone longitudinal axis and the neck longitudinal axis, and the first neck angle and the second neck angle are selected to suit treatment needs.

16. The method according to claim 1, wherein:

the blade has both a geometry and a supported attachment selected to meet the blade deflection parameters, and a geometrical configuration of the treatment tool is selected to suit user and treatment needs for spreading of the substance on the surface of the fragile object, and the treatment tool is fabricated in said one production process by a twin material molding process.

17. The method according to claim 1, wherein:

a cutout separates the blade root from the handle root.

18. The method according to claim 1, wherein:

the treatment tool is manufactured with the blade deflection parameters in said one single-step operation by said one production process.

* * * * *